United States Patent
Kim et al.

(10) Patent No.: US 10,203,539 B2
(45) Date of Patent: Feb. 12, 2019

(54) LIQUID CRYSTAL DEVICE

(71) Applicant: LG Chem, Ltd., Seoul (KR)

(72) Inventors: Jung Woon Kim, Daejeon (KR); Sung Joon Min, Daejeon (KR); Jung Sun You, Daejeon (KR); Jin Hong Kim, Daejeon (KR); Eun Jung Lim, Daejeon (KR); Dong Hyun Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/540,430

(22) PCT Filed: Feb. 5, 2016

(86) PCT No.: PCT/KR2016/001299
§ 371 (c)(1),
(2) Date: Jun. 28, 2017

(87) PCT Pub. No.: WO2016/133308
PCT Pub. Date: Aug. 25, 2016

(65) Prior Publication Data
US 2018/0011352 A1  Jan. 11, 2018

(30) Foreign Application Priority Data

Feb. 16, 2015  (KR) .......... 10-2015-0023159

(51) Int. Cl.
*G02F 1/1334*  (2006.01)
*C09K 19/60*  (2006.01)
(Continued)

(52) U.S. Cl.
CPC .......... *G02F 1/1334* (2013.01); *C09K 19/544* (2013.01); *C09K 19/60* (2013.01);
(Continued)

(58) Field of Classification Search
CPC .................................................. G02F 1/1334
See application file for complete search history.

(56) References Cited

U.S. PATENT DOCUMENTS 5,579,140 A * 11/1996 Yamahara ......... G02F 1/133377
349/124
5,645,758 A * 7/1997 Kawasumi ............. C09K 19/52
252/299.01
(Continued)

FOREIGN PATENT DOCUMENTS

JP  H854634 A  2/1996
JP  2007047581 A  2/2007
(Continued)

OTHER PUBLICATIONS

Search Report from International Application No. PCT/KR2016/001299, dated May 13, 2016.
(Continued)

*Primary Examiner* — Sang V Nguyen
(74) *Attorney, Agent, or Firm* — Lerner, David, Littenberg, Krumholz & Mentlik, LLP (57) ABSTRACT

The present invention relates to a liquid crystal device, a method of manufacturing the liquid crystal device, and the use of the liquid crystal device. The liquid crystal device according to the present invention has excellent light shielding rate variability characteristics. Such a liquid crystal device can be applied to various optical modulation devices such as a smart window, a window protection film, a flexible display device, an active retarder for displaying a 3D image, or a viewing angle adjustment film.

11 Claims, 2 Drawing Sheets

(51) Int. Cl.
  *G02F 1/1339* (2006.01)
  *C09K 19/54* (2006.01)
  *G02F 1/1333* (2006.01)
  *G02F 1/1343* (2006.01)

(52) U.S. Cl.
  CPC ...... *G02F 1/1339* (2013.01); *G02F 1/133377* (2013.01); *G02F 1/134309* (2013.01); *C09K 2019/546* (2013.01); *G02F 2001/13345* (2013.01); *G02F 2202/04* (2013.01)

(56) References Cited

U.S. PATENT DOCUMENTS

| | | | |
|---|---|---|---|
| 2002/0188053 A1* | 12/2002 | Zang | C09J 153/00 524/474 |
| 2004/0246431 A1 | 12/2004 | Asada | |
| 2006/0146267 A1 | 7/2006 | Choi et al. | |
| 2008/0020007 A1* | 1/2008 | Zang | A61K 8/0295 424/401 |
| 2008/0278643 A1* | 11/2008 | Iwamoto | G02F 1/1337 349/36 |
| 2010/0260030 A1* | 10/2010 | Tao | G02B 5/1828 369/112.02 |
| 2011/0134372 A1* | 6/2011 | Lee | G02F 1/1334 349/88 |
| 2012/0038852 A1* | 2/2012 | Jang | G02F 1/1334 349/86 |
| 2012/0088320 A1* | 4/2012 | Hwang | B29D 11/00788 438/27 |
| 2015/0378189 A1* | 12/2015 | Kim | H01L 51/5268 349/86 |

FOREIGN PATENT DOCUMENTS

| | | | | |
|---|---|---|---|---|
| JP | 20090039724 A | | 2/2009 | |
| JP | 2012-113215 | * | 6/2012 | ........... G02F 1/1334 |
| JP | 2012113215 A | | 6/2012 | |
| KR | 19930013794 | | 7/1993 | |
| KR | 20060077724 A | | 7/2006 | |
| KR | 20090039724 A | | 4/2009 | |
| KR | 20120036588 A | | 4/2012 | |
| WO | 02093241 A1 | | 11/2002 | |

OTHER PUBLICATIONS

Extended European Search Report including Written Opinion for Application No. EP16752638.3 dated Sep. 12, 2018.

* cited by examiner

LIQUID CRYSTAL DEVICE

CROSS-REFERENCE TO RELATED APPLICATIONS

The present application is a national phase entry under 35 U.S.C. § 371 of International Application No. PCT/KR2016/001299, filed Feb. 5, 2016, which claims priority from Korean Patent Application No. 10-2015-0023159, filed Feb. 16, 2015, the disclosures of which are incorporated herein by reference.

TECHNICAL FIELD

The present invention relates to a liquid crystal device, a method of manufacturing the liquid crystal device, and the use of the liquid crystal device.

BACKGROUND ART

Liquid crystal display devices (LCDs) are used to orient a liquid crystal compound and switch the orientation through the application of a voltage, thereby realizing images. A process of manufacturing the LCDs is a very expensive process, and requires large production lines and facilities.

Generally, polymer-dispersed liquid crystals (PDLCs; in this specification, the term "PDLC" is generally used as a superordinate concept including polymer-network liquid crystals (PNLCs), polymer-stabilized liquid crystals (PSLCs), etc.) realized by dispersing a liquid crystal compound in a polymer have been known. The PDLCs may be prepared by simpler processes, compared to the LCDs.

As disclosed in Patent Document 1 (Korean Patent Unexamined Publication No. 1993-0013794), a conventional liquid crystal compound is present in an unaligned state in the PDLCs. Therefore, when a voltage is not applied to the PDLCs, the PDLCs are in an opaque state, which is generally referred to as a scattering mode. When a voltage is applied to the PDLCs, the liquid crystal compound is aligned accordingly to be in a transparent state. In this way, the liquid crystal compound is switchable between a transmissive mode and a scattering mode.

DISCLOSURE

Technical Problem

The present invention is directed to providing a liquid crystal device, a method of manufacturing the liquid crystal device, and the use of the liquid crystal device.

Technical Solution

Figure 1:
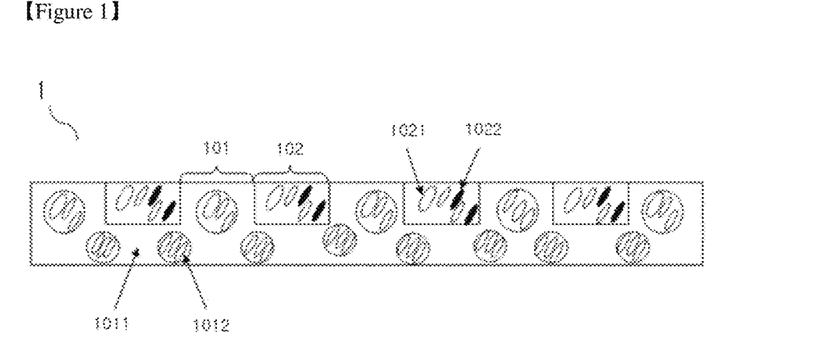
FIGS. 1 to 3 are schematic diagrams showing an exemplary liquid crystal device.

One aspect of the present invention provides an exemplary liquid crystal device including a liquid crystal layer. The liquid crystal layer may include two or more partition walls. Each of the two or more partition walls may include a polymer network, and a first liquid crystal compound dispersed in the polymer network. Each of the two or more partition walls may not include an anisotropic dye. The liquid crystal layer may also include a second liquid crystal compound and an anisotropic dye. The second liquid crystal compound and the anisotropic dye may be present in a region formed between the two or more partition walls. The liquid crystal layer may not include a polymer network. FIG. 1 is a schematic diagram showing such a liquid crystal device. As shown in FIG. 1, the liquid crystal device may include two or more partition walls 101 including a polymer network 1011 and a first liquid crystal compound 1012 dispersed in the polymer network; and a liquid crystal layer 1 including a second liquid crystal compound 1021 and an anisotropic dye 1022, both of which are present in a region 102 formed between the two or more partition walls.

In the present invention, the first liquid crystal compound may be present in the polymer network in a state in which the first liquid crystal compound is phase-separated from the polymer network. Also, the first liquid crystal compound may be included in the polymer network in a state in which the first liquid crystal compound is dispersed in the polymer network so that the orientation of the first liquid crystal compound is switchable. The second liquid crystal compound and the anisotropic dye may be present in the liquid crystal layer in a state in which the second liquid crystal compound and the anisotropic dye are separated from the polymer network by means of the partition walls. Also, the second liquid crystal compound and the anisotropic dye may also be included in the region formed between the partition walls so that the orientation of the second liquid crystal compound and the anisotropic dye is switchable. In this specification, the "orientation of the liquid crystal compound or anisotropic dye being switchable" means that an alignment direction of the liquid crystal compound or the anisotropic dye may be changed by an external action such as application of a voltage.

The first liquid crystal compound, the second liquid crystal compound, or the anisotropic dye may be in an unaligned state in an initial state. In this specification, the term "initial state" may mean a state in which there is no external action, such as an external voltage, which may have an influence on the liquid crystal compound or the anisotropic dye. The initial state of the liquid crystal compound or the anisotropic dye may be converted by the external action, and such a converted state may return to the initial state when the external action disappears. For example, when the liquid crystal compound is in an unaligned state in the initial state, the initial state of the liquid crystal compound may be converted into an aligned state due to the external action, and the converted state may return to the unaligned state when an external voltage disappears.

In the present invention, the polymer network may be a network of a precursor including a polymerizable compound, and the polymerizable compound may form a polymer network in a polymerized state. For example, a compound containing one or more polymerizable functional groups generally known to form a polymer network of PDLCs may be used as the polymerizable compound. When necessary, a non-polymerizable compound having no polymerizable functional groups may be additionally used. Examples of the polymerizable functional group may, for example, include an alkenyl group, an epoxy group, a cyano group, a carboxyl group, a (meth)acryloyl group, or a (meth)acryloyloxy group. According to one exemplary embodiment of the present invention, a compound containing a (meth)acryloyl group may be used. More specifically, a monofunctional acrylate, a bifunctional acrylate, a multifunctional acrylate, or a urethane acrylate-multifunctional oligomer may be used as the polymerizable compound.

The polymer network may, for example, include at least one selected from the group consisting of a monofunctional acrylate, a bifunctional acrylate, a trifunctional or more multifunctional acrylate, and a urethane acrylate-multifunctional oligomer, and a content of the polymer network may be adjusted to be within a range in which the object of the present invention is not hindered. According to one exemplary embodiment of the present invention, the polymer network may include the monofunctional acrylate at 10 to 90 parts by weight, the bifunctional acrylate at 1 to 90 parts by weight, the multifunctional acrylate at 1 to 50 parts by weight, and the urethane acrylate-multifunctional oligomer at 1 to 50 parts by weight, but the present invention is not limited thereto.

For example, a compound represented by the following Formula 1 may be used as the bifunctional acrylate.

[Formula 1]

In Formula 1, R is each independently hydrogen or an alkyl group having 1 to 4 carbon atoms, and X is an alkylene or alkylidene group having 1 to 20 carbon atoms.

For example, a compound represented by the following Formula 2 may be used as the multifunctional acrylate.

[Formula 2]

In Formula 2, n is an integer greater than or equal to 3, m is an integer ranging from 0 to 5, R is each independently hydrogen or an alkyl group having 1 to 4 carbon atoms, X is an (m+n)-valent radical, and Y is hydrogen or an alkyl group.

For example, a compound represented by the following Formula 3 may be used as the monofunctional acrylate.

[Formula 3]

In Formula 3, R is hydrogen or an alkyl group having 1 to 4 carbon atoms, and X is an alkyl group having 1 to 20 carbon atoms.

In Formulas 1 to 3, examples of the alkyl group that may be present at R or Y may include a methyl group or an ethyl group.

In Formula 1, the alkylene or alkylidene group of X may, for example, be an alkylene or alkylidene group having 1 to 16 carbon atoms, 1 to 12 carbon atoms, 1 to 10 carbon atoms, 1 to 8 carbon atoms, 2 to 8 carbon atoms, or 4 to 8 carbon atoms. The alkylene or alkylidene group may, for example, be linear, branched, or cyclic.

In Formula 2, n may be an integer greater than or equal to 3, or an integer ranging from 3 to 8, 3 to 7, 3 to 6, 3 to 5, or 3 to 4. Also, in Formula 2, m may be an integer ranging from 0 to 5, 0 to 4, 0 to 3, 0 to 2, or 0 to 1.

In Formula 2, X may be an (m+n)-valent radical, for example, a hydrocarbon having 2 to 20 carbon atoms, 2 to 16 carbon atoms, 2 to 12 carbon atoms, 2 to 8 carbon atoms, or 2 to 6 carbon atoms, such as an (m+n)-valent radical derived from a linear or branched alkane.

In Formula 3, X may be an alkyl group, for example, a linear or branched alkyl group having 1 to 20 carbon atoms, 1 to 16 carbon atoms, 1 to 12 carbon atoms, 4 to 12 carbon atoms, or 6 to 12 carbon atoms.

The substituents defined in Formula 1 to 3, for example, the alkyl group, the alkylene group, the alkylidene group, or the (m+n)-valent radical may be substituted with one or more substituents, when necessary. In this case, examples of the substituents may, for example, include an alkyl group, an alkoxy group, an epoxy group, an oxo group, an oxetanyl group, a thiol group, a cyano group, a carboxyl group, or an aryl group, but the present invention is not limited thereto.

For example, an oligomer (hereinafter referred to as an acrylate-multifunctional oligomer) containing two or more acryloyl groups or methacryloyl groups may be used as the multifunctional oligomer. A compound containing two acryloyl or methacryloyl groups may be used as the acrylate-multifunctional oligomer in consideration of curability, etc. A urethane acrylate-multifunctional oligomer may, for example, be used as the acrylate-multifunctional oligomer. A compound represented by the following Formula 4 may, for example, be used as the urethane acrylate-multifunctional oligomer.

[Formula 4]

In Formula 4, $R_1$ is a hydrogen or a methyl group, $R_2$ is an aliphatic alkyl group having 2 to 12 carbon atoms, $R_3$ is toluene, diphenylmethane, hexamethylene, isophorone, tetramethylxylene, dicyclohexylmethane, naphthalene, or phenylene, X is $-(CH_2CH_2O)_{m1}-CH_2CH_2-$, or $-(CH_2CH(CH_3)O)_{m2}-CH_2CH(CH_3)-$, $m_1$ and $m_2$ are each independently an integer of 1 or more, and n is an integer ranging from 1 to 20.

A weight average molecular weight of the multifunctional oligomer may be properly selected within a range in which desired physical properties are not hindered. For example, the oligomer may have a weight average molecular weight of 1,500 or more, 1,600 or more, 1,700 or more, 1,800 or more, 1,900 or more, 2,000 or more, 2,100 or more, 2,200 or more, 2,300 or more, 2,400 or more, or 2,500 or more, and a weight average molecular weight of 7,000 or less, 6,800 or less, 6,600 or less, 6,400 or less, 6,200 or less, 6,000 or less, 5,800 or less, 5,600 or less, 5,400 or less, 5,200 or less, or 5,000 or less as upper limit thereof.

Unless particularly defined otherwise in this specification, the alkyl group may, for example, be a linear or branched alkyl group having 1 to 20 carbon atoms, 1 to 16 carbon atoms, 1 to 12 carbon atoms, 1 to 8 carbon atoms, or 1 to 4 carbon atoms. The alkyl group may be optionally substituted with one or more substituents.

Unless particularly defined otherwise in this specification, the aryl or arylene group may refer to a monovalent or divalent residue derived from an aromatic compound or a derivative thereof, which includes a benzene ring or has a structure in which two or more benzene rings are condensed or joined together while sharing one or two carbon atoms. The aryl or arylene group may, for example, be an aryl or arylene group having 6 to 22 carbon atoms, 6 to 20 carbon atoms, 6 to 18 carbon atoms, 6 to 16 carbon atoms, 6 to 14 carbon atoms, or 6 to 12 carbon atoms. The aryl or arylene group may be optionally substituted with one or more substituents.

Unless particularly defined otherwise in this specification, the alkylene or alkylidene group may, for example, refer to an alkylene or alkylidene group having 1 to 20 carbon atoms, 1 to 16 carbon atoms, 1 to 12 carbon atoms, 1 to 8 carbon atoms, or 1 to 4 carbon atoms. The alkylene or alkylidene group may, for example, be linear, branched, or cyclic. Also, the alkylene or alkylidene group may be optionally substituted with one or more substituents.

In this specification, examples of the substituent that may replace the alkyl group, the aryl group, the alkylene group, or the alkylidene group may include a halogen atom such as chlorine, bromine or iodine, an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group, or an aryl group, but the present invention is not limited thereto.

One of the above-described compounds or a combination of two or more may be selected as a curable compound which may be included in the precursor, or materials known to form a polymer network of PDLC beside the above-described compounds, or one of the known materials or a combination of two or more may be used.

In addition to the above-described compounds, the polymer network or precursor thereof may further include an additive such as a solvent, a radical or cationic initiator, a basic material, other reactive compounds capable of forming a network, a liquid crystal compound, or a surfactant, when necessary.

Various types of liquid crystal compounds may be used as the first liquid crystal compound without particular limitation as long as the liquid crystal compounds can be present in a state in which the orientation of the liquid crystal compound in the polymer network is switchable and can adjust the optical modulation characteristics of the liquid crystal device due to the switching of the orientation of the liquid crystal compound. For example, when the orientation of the first liquid crystal compound is not regularly aligned but is randomly aligned in a predetermined direction, light scattering may be induced through an action with the polymer network. When the orientation of the first liquid crystal compound is regularly aligned in a predetermined direction, a compound that may act in a transmissive mode or a mode in which the compound has a proper phase difference according to an orientation direction thereof may be used.

For example, a smectic liquid crystal compound, a nematic liquid crystal compound, or a cholesteric liquid crystal compound may be used as the first liquid crystal compound. The liquid crystal compound is not bound to the polymer network, and may be present in a state in which the orientation of the liquid crystal compound is changed when a voltage is applied from the outside. For this purpose, the liquid crystal compound may, for example, be a compound containing no curable groups or polymerizable groups.

According to one exemplary embodiment, a nematic liquid crystal compound satisfying the following Expression A may, for example, be used as the first liquid crystal compound.

$$(n_e+n_o)/2-b \leq \{(2n_o^2+n_e^2)/3\}^{0.5} \leq (n_e+n_o)/2+b \quad \text{[Expression A]}$$

In Expression A, $n_e$ represents an extraordinary refractive index of the liquid crystal compound, $n_o$ represents an ordinary refractive index of the liquid crystal compound, and b is a number ranging from 0.1 to 1. In Expression A, b may a number ranging from 0.1 to 0.9, 0.1 to 0.7, 0.1 to 0.5, or 0.1 to 0.3 according to another exemplary embodiment.

A liquid crystal compound having positive dielectric anisotropy or negative dielectric anisotropy may, for example, be used as the first liquid crystal compound. In the present invention, the dielectric anisotropy refers to a difference between extraordinary dielectric anisotropy ($\varepsilon_e$: a dielectric constant in a major axis direction) and ordinary dielectric anisotropy ($\varepsilon_o$: a dielectric constant in a minor axis direction), the positive dielectric anisotropy means that the extraordinary dielectric constant is greater than the ordinary dielectric constant, and the negative dielectric anisotropy means that the extraordinary dielectric constant is smaller than the ordinary dielectric constant. The first liquid crystal compound may have a difference between an extraordinary dielectric constant and an ordinary dielectric constant of 4 or more, 6 or more, 8 or more, or 10 or more. When the first liquid crystal compound has such a dielectric anisotropy, a device having excellent drive voltage characteristics may be provided. As the difference between the dielectric constants becomes higher, the device may exhibit proper characteristics. In this case, the upper limit of the difference between dielectric constants is not particularly limited. For example, a compound having an extraordinary dielectric constant of approximately 6 to 50 and an ordinary dielectric constant of approximately 2.5 to 7 may be used as the liquid crystal compound.

Each of the partition walls may include a polymer network at 5 parts by weight to 80 parts by weight, and a first liquid crystal compound at 30 parts by weight to 99 parts by weight. According to other exemplary embodiments, each of the partition walls may include the polymer network at 5 parts by weight to 65 parts by weight and the liquid crystal compound at 35 parts by weight to 95 parts by weight; the polymer network at 5 parts by weight to 60 parts by weight and the liquid crystal compound at 40 parts by weight to 95 parts by weight; the polymer network at 5 parts by weight to 55 parts by weight and the liquid crystal compound at 55 parts by weight to 95 parts by weight; the polymer network at 5 parts by weight to 50 parts by weight and the liquid crystal compound at 50 parts by weight to 95 parts by weight; the polymer network at 5 parts by weight to 45 parts by weight and the liquid crystal compound at 55 parts by weight to 95 parts by weight; the polymer network at 5 parts by weight to 40 parts by weight and the liquid crystal compound at 60 parts by weight to 95 parts by weight; the polymer network at 5 parts by weight to 35 parts by weight and the liquid crystal compound at 65 parts by weight to 95 parts by weight; the polymer network at 5 parts by weight to 30 parts by weight and the liquid crystal compound at 70 parts by weight to 95 parts by weight; the polymer network at 5 parts by weight to 25 parts by weight and the liquid crystal compound at 75 parts by weight to 95 parts by weight; the polymer network at 20 parts by weight to 50 parts by weight and the liquid crystal compound at 80 parts by weight to 95 parts by weight; or the polymer network at 5 parts by weight to 15 parts by weight and the liquid crystal compound at 85 parts by weight to 95 parts by weight. Within these weight ranges, desired physical properties, for example, an orientation property of the polymer network, may be properly maintained.

The width and height of the partition walls, the gap between the partition walls, and the area ratio of the partition walls in the liquid crystal layer may be properly selected within a range in which the object of the present invention is not hindered. The width of the partition walls may be, for example, adjusted to be within a range of 3 μm to 100 μm, the height of the partition walls may be, for example, adjusted to be within a range of 3 μm to 100 μm, and the gap between the partition walls may be, for example, adjusted to be within a range of 10 μm to 1,000 μm. Also, the area ratio of the partition walls may be, for example, adjusted to be within a range of 0.1% to 50%, based on 100% of the total area of the liquid crystal layer. A method of aligning the partition walls or columns is not particularly limited. For example, the partition walls or columns may be regularly or randomly aligned according to a desired alignment method.

As described above, the second liquid crystal compound and the anisotropic dye may be present in the region formed between the partition walls. For example, proper types of the second liquid crystal compound may be selected from the liquid crystal compounds included in the list of the first liquid crystal compounds. The first liquid crystal compound and the second liquid crystal compound may be the same or different from each other.

As used for the anisotropic dye in this specification, the term "dye" may refer to a material that may intensively absorb and/or transform light in at least some or all of a visible region, for example, a wavelength range of 400 nm to 700 nm, the term "anisotropic dye" may refer to a material that may anisotropically absorb light in at least some or all of the visible region. When such a dye is used, the liquid crystal device may be applied to display devices to adjust colors of the devices.

The anisotropic dye is not particularly limited, and all types of dyes known to have the above-described characteristic and also have an ability to be aligned according to the orientation of the liquid crystal compound may be used. For example, a black dye or a color dye may be used as the anisotropic dye. A dye having a dichroic ratio of 5 or more, 6 or more or 7 or more may be used as the anisotropic dye. That is, the dichroic ratio is a value obtained by dividing an absorbance of polarized light parallel to a major axis direction of the anisotropic dye by an absorbance of polarized light parallel to a direction perpendicular to the major axis direction. The dye may satisfy the dichroic ratio at at least some wavelengths or one wavelength in a wavelength range of a visual light region, for example, a wavelength range of approximately 380 nm to 700 nm, or approximately 400 nm to 700 nm. When the dichroic ratio becomes higher, it is more effective in improving the light shielding rate or realizing colors. Therefore, the upper limit of the dichroic ratio is not particularly limited, an anisotropic dye having a proper dichroic ratio may be selected and used in consideration to its ability to realize the desired colors. The upper limit of the dichroic ratio may, for example, be approximately 20, 18, 16, or 14, but the present invention is not limited thereto.

The exemplary liquid crystal device may include such an anisotropic dye in a state in which the anisotropic dye is physically separated from the polymer network. Therefore, since a cause of transmissivity inhibition may be eliminated by preventing anisotropic dye contamination within the polymer network, excellent light shielding rate variability characteristics may be exhibited. Also, since the anisotropic dye does not cut off energy used to form a polymer network, curable characteristics of the polymer network may be improved to enhance an adhesive strength. Further, since the anisotropic dye does not come in contact with an initiator in the polymer precursor, a problem of the dye becoming discolored when degraded by the initiator may be solved.

The thickness of the liquid crystal layer may be properly selected within a range in which the desired physical properties are not hindered, for example, transmissivity variability characteristics, etc., and may, for example, be in a range of approximately 1 μm to 10 μm.

Figure 2:
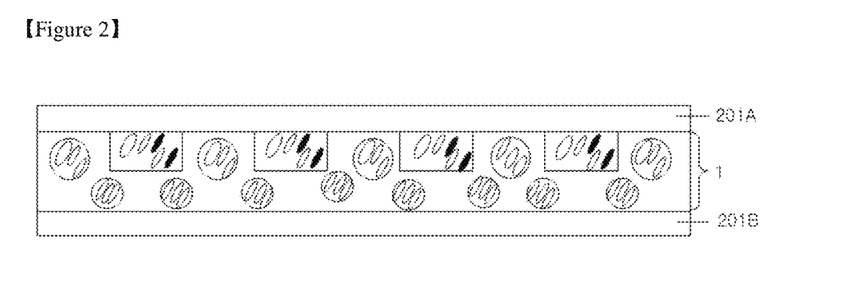

The liquid crystal device may further include a substrate layer adjacent to the liquid crystal layer. The substrate layer may, for example, be adjacent to the partition walls, or a region in which the second liquid crystal compound and the anisotropic dye are present. Typically, the liquid crystal layer may be disposed between two facing substrate layers. FIG. 2 is a schematic diagram showing a liquid crystal device including a liquid crystal layer 1 present between substrate layers 201A and 201B disposed spaced apart by a predetermined gap to face each other.

As the substrate layer, known materials may be used without particular limitations. For example, an inorganic film such as a glass film, a crystalline or amorphous silicon film, or a quartz or indium tin oxide (ITO) film, or a plastic film may be used. An optically isotropic substrate layer, an optically anisotropic substrate layer such as a retardation layer, a polarizing plate, or a color filter substrate may be used as the substrate layer. For example, when a polarizing layer is present inside the substrate layer, that is, present between the liquid crystal layer and the substrate layer, a device having proper performance may be realized even when an anisotropic substrate layer is used as the substrate layer.

Triacetyl cellulose (TAC); a cyclo-olefin copolymer (COP) such as a norbornene derivative, poly(methyl methacrylate) (PMMA); polycarbonate (PC); polyethylene (PE); polypropylene (PP); polyvinyl alcohol (PVA); diacetyl cellulose (DAC); polyacrylate (Pac); polyether sulfone (PES); polyetheretherketone (PEEK); polyphenylsulfone (PPS), polyetherimide (PEI); polyethylene naphthatlate (PEN); polyethylene terephthalate (PET); polyimide (PI); polysulfone (PSF); polyacrylate (PAR), or an amorphous fluorine resin may be used as the plastic substrate layer, but the present invention is not limited thereto. When necessary, a coating layer such as a coating layer formed of gold, silver, or a silicon compound such as silicon dioxide or silicon monoxide, or a coating layer such as an anti-reflection layer may also be present on the substrate layer.

Figure 3:
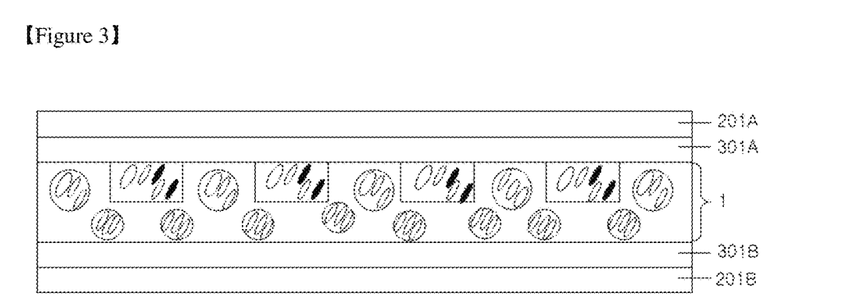

The liquid crystal device may further include an electrode layer adjacent to the liquid crystal layer. The electrode layer may, for example, be disposed adjacent to the partition walls or the region in which the second liquid crystal compound is present. When the liquid crystal device includes a substrate layer, the electrode layer may be disposed inside the substrate layer, for example, disposed between the liquid crystal layer and the substrate layer. FIG. 3 is a schematic diagram showing an exemplary liquid crystal device including a liquid crystal layer 1 present between substrate layers 201A and 201B and electrode layers 301A and 301B disposed spaced apart by a predetermined gap to face each other. The electrode layer applies a voltage to the liquid crystal layer so that the orientation of the liquid crystal compound or the anisotropic dye is switchable. The electrode layer may, for example, be formed by depositing a metal oxide such as a conductive polymer, a conductive metal, conductive nanowires, or indium tin oxide (ITO). The electrode layer may be formed to exhibit transparency. Various materials capable of forming a transparent electrode layer, and methods of forming the transparent electrode layer are known in the related art. Here, all such methods are applicable. The electrode layer formed on a surface of the substrate layer may be properly patterned, when necessary.

The liquid crystal device has excellent light shielding rate variability characteristics. The liquid crystal device may, for example, be a device whose light shielding rate variability is within a range of 3% to 90% in an initial state and a state in which there is an external action such as application of a voltage. The liquid crystal device according to the present invention may exhibit excellent light shielding rate variability characteristics since the anisotropic dye may be prevented from contaminating the polymer network to remove a cause of transmissivity inhibition.

The liquid crystal device is switchable between a scattering mode and a transmissive mode by applying an external action such as a voltage. The liquid crystal device may, for example, be in a scattering mode in an initial state, and may then be in a transmissive mode when a voltage is applied thereto. In this specification, the term "scattering mode" may refer to a mode in which the liquid crystal device has a haze higher than a predetermined level, and the term "transmissive mode" may refer to a mode in which transmission of light is possible or the liquid crystal device has a haze lower than a predetermined level. For example, the haze of the liquid crystal device in the transmissive mode may be less than or equal to 10%, 8%, 6%, or 5%. For example, the haze of the liquid crystal device in the scattering mode may be greater than or equal to 10%, 15%, 20%, 25%, 30%, 35%, 40%, 45%, 50%, 55%, 60%, 65%, 70%, 75%, 80%, 85%, 90%, or 95%.

Another aspect of the present invention provides a method of manufacturing the liquid crystal device. The method of manufacturing the exemplary liquid crystal device includes forming two or more partition walls using a composition (hereinafter referred to as a PDLC composition) including a curable polymer network precursor and a first liquid crystal compound, and disposing a second liquid crystal compound and an anisotropic dye in a region formed between the two or more partition walls. In the manufacturing method, the polymer network precursor, the first liquid crystal compound, the partition walls, the second liquid crystal compound, and the anisotropic dye may be applied in the same manner as in the contents described for the parts of the liquid crystal device.

The partition walls may be formed by imprinting a layer of the PDLC composition. A method of forming the layer of the PDLC composition is not particularly limited. For example, the layer of the PDLC composition may be formed by coating using a known coating method such as roll coating, a printing method, ink-jet coating, a slit nozzle method, bar coating, comma coating, spin coating, or gravure coating. The partition walls may be formed by curing or polymerizing the layer of the PDLC composition. The curing or polymerization may be performed by irradiating the composition with a suitable energy, for example, light, to induce the curing or polymerization. In this case, the partition walls may be in a partially cured state, and then may be completely cured by additional energy irradiation after a layer including the second liquid crystal compound is laminated as will be described below.

The partition walls may be formed by imprinting the layer of the PDLC composition. When the composition includes a solvent, etc., the imprinting may be performed after the composition is properly dried to volatilize the solvent, etc. An imprinting process may be performed by known methods. The imprinting process may, for example, be performed using a stamp or roller having a pattern, which may be used to transfer the partition walls with a desired shape to the layer of the PDLC composition. The irradiation of energy used to cure or polymerize the layer of the PDLC composition may be performed by irradiating the layer of the composition with UV rays during or after the imprinting process. The shape of the pattern in the partition walls may be properly changed according to specific applications of the liquid crystal device. For example, the pattern may be in a lattice or honeycomb shape.

The liquid crystal device may include laminating a first substrate and a second substrate on each other, wherein the two or more partition walls formed using the PDLC composition are present on a surface of the first substrate, and a layer including the second liquid crystal compound and the anisotropic dye is formed on the second substrate. A method of forming the layer including the second liquid crystal compound and the anisotropic dye is not particularly limited. For example, the layer including the second liquid crystal compound and the anisotropic dye may be formed by coating using a known coating method such as roll coating, a printing method, ink-jet coating, a slit nozzle method, bar coating, comma coating, spin coating, or gravure coating. The polymer network precursor of each of the partition walls on the first substrate may be present in a cured state before the polymer network precursor is laminated on the second substrate. Therefore, the manufactured liquid crystal device may minimize anisotropic dye contamination within the cured polymer network.

Still another aspect of the present invention provides the use of the liquid crystal device. The exemplary liquid crystal device has excellent light shielding rate variability characteristics. Such a liquid crystal device may be efficiently used in an optical modulation device. Examples of the optical modulation device may include a smart window, a window protection film, a flexible display device, an active retarder for displaying a 3D image, or a viewing angle adjustment film, but the present invention is not limited thereto. A method of constituting such an optical modulation device is not particularly limited, and conventional methods are applicable to the liquid crystal device as long as the liquid crystal device is used.

Advantageous Effects

The liquid crystal device according to the present invention has excellent light shielding rate variability characteristics. Such a liquid crystal device can be applied to various optical modulation devices such as a smart window, a window protection film, a flexible display device, an active retarder for displaying a 3D image, or a viewing angle adjustment film.

BEST MODE

Hereinafter, the present invention will be described in further detail with reference to the following Example and Comparative Example, but it is to be understood that the description proposed herein is not intended to limit the scope of the invention.

Example 1

100 mg of a urethane acrylate-multifunctional oligomer (SU530, Mw: 5,000, commercially available from Soltech Ltd.), 300 mg of a bifunctional acrylate (HDDA commercially available from Sigma-Aldrich), 20 mg of a trifunctional acrylate (PETA commercially available from Sigma-Aldrich), 570 mg of a monofunctional acrylate (EHA commercially available from TCI), and 10 mg of a photoinitiatior (Zs-539 commercially available from Fuji Film) were mixed to prepare a polymer precursor, and 2.3 g of a liquid crystal compound (HPC21600 commercially available from HCCH) was added to the precursor. Thereafter, 40 mg of a ball-typed spacer having a diameter of 10 μm was added, and the mixture was agitated for 7 hours in an agitator to prepare a PDLC composition. A surface of an ITO layer of a PET film (100 mm×100 mm) (hereinafter referred to as a PET/ITO film) on which an ITO transparent electrode layer was deposited was bar-coated with the PDLC composition using a Mayer bar (#10), covered with a soft mold (diameter: 200 um, barrier rib width: 20 um, and barrier rib height: 15 um), and then laminated. Thereafter, the imprinted PDLCs were transferred to a surface of the PET/ITO film by irradiating the PDLCs with UV rays for 20 seconds under a high-pressure mercury lamp (30 mW). Next, another PET/ITO film was coated with a second liquid crystal composition including 2 g of a liquid crystal compound (HPC21600 commercially available from HCCH) and 20 mg of an anisotropic dye (X12 commercially available from BASF), and the two films were then laminated.

Comparative Example 1

100 mg of a urethane acrylate-multifunctional oligomer (SU530, Mw: 5,000, commercially available from Soltech Ltd.), 300 mg of a bifunctional acrylate (HDDA commercially available from Sigma-Aldrich), 20 mg of a trifunctional acrylate (PETA commercially available from Sigma-Aldrich), 570 mg of a monofunctional acrylate (EHA commercially available from TCI), 23 mg of an anisotropic dye (X12 commercially available from BASF), and 10 mg of a photoinitiatior (Zs-539 commercially available from Fuji Film) were mixed to prepare a polymer precursor, and 2.3 g of a liquid crystal compound (HPC21600 commercially available from HCCH) and 20 mg of an anisotropic dye (X12 commercially available from BASF) were added to the precursor. Thereafter, 20 mg of a ball-typed spacer having a diameter of 25 μm was added, and the mixture was agitated for 7 hours in an agitator to prepare a liquid crystal composition. Then, a surface of an ITO layer of the PET/ITO film was bar-coated with the liquid crystal composition using a Mayer bar (#14). Another PET/ITO film was laminated onto the coated composition so that the other PET/ITO film came in contact with the composition, and then irradiated with UV rays for 20 seconds under a high-pressure mercury lamp (30 mW) to manufacture a liquid crystal device.

Figure 4:
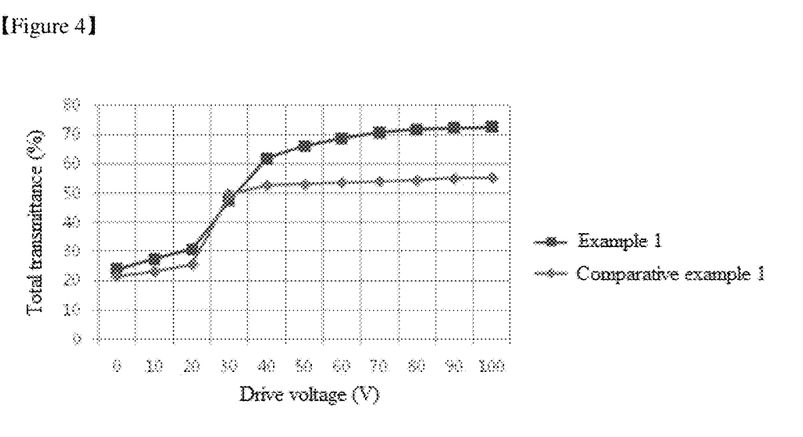
FIG. 4 shows results of the evaluation of the light shielding rate.

Experimental Example 1: Evaluation of Light Shielding Rate of Liquid Crystal Device The total transmittance of each of the liquid crystal devices manufactured in Example 1 and Comparative Example 1 in an initial state and when a voltage is applied thereto was measured using a hazemeter (NDH-5000SP) to evaluate a shielding rate. The results are shown in FIG. 4 and listed in Table 1. The results of evaluation of the total transmittance showed that the total transmittance of the liquid crystal device of Comparative Example 1 in the initial state and upon the application of the voltage was changed from 21% to 55%, and the total transmittance of the liquid crystal device of Example 1 in the initial state and upon the application of the voltage was changed from 23% to 72%. From the results of evaluation of such a shielding rate, it can be seen that the liquid crystal device of Comparative Example 1 had degraded light shielding rate variability characteristics due to contamination of the polymer network by the anisotropic dye, and the liquid crystal device of Example 1 had excellent light shielding rate variability characteristics since the contamination of the polymer network by the anisotropic dye may be reduced.

TABLE 1

|  |  | Example 1 | Comparative Example 1 |
|---|---|---|---|
| Shielding rate | Initial state (0 V) | 23% | 21% |
|  | Voltage applied (100 V) | 72% | 55% |

BRIEF DESCRIPTION OF PARTS IN THE DRAWINGS

1: liquid crystal layer
101: barrier rib
1011: polymer network
1012: first liquid crystal compound
102: region formed between partition walls
1021: second liquid crystal compound
1022: anisotropic dye
201A, 201B: substrate layer
301A, 301B: electrode layer

The invention claimed is:
1. A liquid crystal device comprising:
a liquid crystal layer disposed between two electrode layers, the liquid crystal layer comprising two or more partition walls separated by a region therebetween, the two or more partition walls comprising a polymer network having a first liquid crystal compound dispersed therein,
wherein the region includes a second liquid crystal compound and an anisotropic dye disposed therein,
wherein the two or more partition walls, the second liquid crystal compound, and the anisotropic dye are in direct contact with one of the two electrode layers,
wherein the two or more partition walls are oriented perpendicular to the surface of the one of the two electrode layers,
wherein the two or more partition walls do not include the anisotropic dye.
2. The liquid crystal device of claim 1, wherein a gap between the two or more partition walls is in a range of 10 μm to 1,000 μm.
3. The liquid crystal device of claim 1, wherein a width of the each partition wall is in a range of 3 μm to 100 μm.
4. The liquid crystal device of claim 1, wherein a height of the each partition wall is in a range of 3 μm to 100 μm.
5. The liquid crystal device of claim 1, wherein an cross sectional area ratio of the partition walls is in a range of

0.1% to 50%, based on a total cross sectional area of the liquid crystal layer, wherein a cross sectional area of each partition wall is defined by a width and height of the partition wall.

6. The liquid crystal device of claim 1, wherein the first liquid crystal compound, the second liquid crystal compound, or the anisotropic dye is present in an unaligned state.

7. The liquid crystal device of claim 1, wherein the anisotropic dye is a black dye or a color dye.

8. The liquid crystal device of claim 1, further comprising a substrate layer that is adjacent to one of the electrode layers, the electrode layer disposed between the liquid crystal layer and the substrate layer.

9. The liquid crystal device of claim 1, which has a variable light shielding rate ranging from 3% to 90%.

10. A method of manufacturing a liquid crystal device, comprising:

forming a first layer on a first substrate, the first layer having a curable polymer network precursor and a first liquid crystal compound, wherein the first substrate comprises a first electrode layer;

imprinting the first layer to form two or more partition walls in a surface of the first layer, the two or more partition walls separated by a region therebetween;

forming a second layer on a second substrate, the second layer having a second liquid crystal compound and an anisotropic dye, the second substrate comprising a second electrode layer, the second electrode layer in direct contact with the second liquid crystal compound and the anisotropic dye; and laminating the first and second substrate such that the second layer is disposed in the region of the first layer to form the liquid crystal device, wherein the two or more partition walls do not include the anisotropic dye, wherein the two or more partition walls are oriented perpendicular to the surface of the second electrode layer, and are in direct contact with the second electrode layer.

11. An optical modulation device comprising the liquid crystal device defined in claim 1.

* * * * *